UNITED STATES PATENT OFFICE.

ISAAC L. MERRELL, OF SAN FRANCISCO, CALIFORNIA.

REMOVING AND PREVENTING SCALE IN STEAM-BOILERS.

SPECIFICATION forming part of Letters Patent No. 264,182, dated September 12, 1882.

Application filed June 15, 1882. (No specimens.)

*To all whom it may concern:*

Be it known that I, ISAAC LAMBERT MERRELL, a citizen of the United States, residing at San Francisco, in the county of San Francisco and State of California, have invented a new and useful Composition of Matter for Removing and Preventing Scale in Steam-Boilers, of which the following is a specification.

My composition consists of the following ingredients, combined in the proportions stated, viz: spent tan-bark, fifty pounds; sawdust from logwood, redwood, or the bark of redwood, fifty pounds; refuse clippings or cuttings from skins, rawhides, or leather, before or after tanning, fifty pounds; refuse clippings or cuttings from tobacco, including stems, fifty pounds. These ingredients are to be put into a digester with sufficient water to keep the mass thoroughly saturated during the process of digestion. The digestion is accomplished by admitting steam into the boiler or digester for a sufficient length of time to cause the particles to be thoroughly disintegrated and brought to the condition or state of pulp. At the same time the water and steam which are admitted should afford sufficient moisture to keep the pulp limpid, or of the consistency of molasses, when it is removed from the digester. When the process of digestion has been completed or accomplished, which can be readily ascertained by making tests, the product or pulp is removed or drawn off into cans for use.

The quantity of my compound requisite to produce the desired result will depend largely upon the purity of the water employed in the boiler and its freedom from lime or other scale-producing properties. Suffice it to say that one-half pint to every horse-power of the boiler will be sufficient, unless the water is very bad, in which case a pint to every horse-power may be employed. The compound may be placed in the boiler once in every two weeks, or oftener if the water is bad or liable to deposit scale.

It should here be observed that my compound will not only remove scale already formed, but will prevent new scale from forming in the boilers.

Having thus described my invention, what I claim, and desire to secure by Letters Patent, is—

The herein-described composition of matter for removing and preventing scale in boilers, consisting of water, tan-bark, sawdust, clippings from skins, rawhides, or leather, and refuse tobacco, in about the proportions specified.

In testimony that I claim the foregoing I have hereunto set my hand and seal this 7th day of June, 1882.

ISAAC LAMBERT MERRELL. [L. S.]

Witnesses:
 GEORGE DERBY,
 WILMER BRADFORD.